(12) United States Patent
Roturier et al.

(10) Patent No.: US 10,418,036 B1
(45) Date of Patent: Sep. 17, 2019

(54) HANDLING COMPUTER SECURITY INCIDENTS THROUGH A UNIFIED CONVERSATIONAL AGENT

(71) Applicant: Symantec Corporation, Mountain View, CA (US)

(72) Inventors: Johann Roturier, Maynooth (IE); David L. Silva, Dublin (IE)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 16/112,111

(22) Filed: Aug. 24, 2018

(51) Int. Cl.
| | |
|---|---|
| *G10L 15/00* | (2013.01) |
| *G10L 15/26* | (2006.01) |
| *H04L 29/06* | (2006.01) |
| *G10L 15/197* | (2013.01) |
| *G10L 15/18* | (2013.01) |
| *G10L 15/22* | (2006.01) |
| *G10L 15/193* | (2013.01) |
| *G06F 17/27* | (2006.01) |
| *G10L 15/183* | (2013.01) |
| *G10L 15/19* | (2013.01) |

(52) U.S. Cl.
CPC ........ *G10L 15/265* (2013.01); *G10L 15/1822* (2013.01); *G10L 15/197* (2013.01); *H04L 63/1425* (2013.01); *H04L 63/1441* (2013.01); *G06F 17/2785* (2013.01); *G10L 15/183* (2013.01); *G10L 15/19* (2013.01); *G10L 15/193* (2013.01); *G10L 15/22* (2013.01)

(58) Field of Classification Search
CPC combination set(s) only.
See application file for complete search history.

(56) References Cited

PUBLICATIONS

Ionut Tamas and Ioan Salomie, "Artemis—an extensible natural language framework for data querying and manipulation" 978-1-5090-3899-2/16/ © 2016 IEEE, pp. 85-91.

*Primary Examiner* — Vu B Hang
(74) *Attorney, Agent, or Firm* — Patterson + Sheridan, LLP (57) ABSTRACT

The present disclosure relates to security incident analysis systems, and more specifically to searching across multiple security incident analysis systems through a unified conversational agent. One example method generally includes receiving, from a client device, a natural language command requesting information about a security incident from a first incident analysis system. One or more keywords related to the security incident are extracted from the natural language command. The unified conversational agent executes a search against the first incident analysis system and one or more second incident analysis systems for the information about the security incident based on the extracted one or more keywords and transmits, to the client device, an indication of the information about the security incident aggregated from the executed search against the first incident analysis system and the one or more second incident analysis systems.

20 Claims, 6 Drawing Sheets

HANDLING COMPUTER SECURITY INCIDENTS THROUGH A UNIFIED CONVERSATIONAL AGENT

BACKGROUND

Field

Embodiments presented herein generally relate to computer security incident analysis systems, and more specifically to conversational interfaces for interacting with computer security incident analysis systems.

Description of the Related Art

Computer security professionals regularly investigate and remediate various computer security incidents, such as malware infections, execution of advanced persistent threats, unauthorized access to computing resources, denial of service attacks, and the like. To aid in investigating and remediating computer security incidents, various computer security incident analysis systems provide functionality for users to investigate a security incident. For example, malware analysis systems may allow a user to upload a suspected malicious file to the system to determine whether the uploaded file is malicious, and, if so, obtain information about the malicious payload in the file. In another example, traffic or intrusion analysis systems may allow a user to query for information about attempts to circumvent access controls on a particular computer system or launch denial of service attacks on a particular computer system. In still further examples, other security incident analysis systems may allow users to obtain information about phishing attacks, advanced persistent threats that attempt to silently exfiltrate data from an organization, botnet applications and command-and-control servers, and so on.

Security incident analysis systems, such as those described above, generally expose querying and analysis functionality via one or more application programming interfaces (APIs). The APIs for each security incident analysis system generally use a unique syntax that may not be applicable to other security incident analysis systems. Because each security incident analysis system exposes a unique API for requesting information, security professionals who use one security incident analysis system may need to rely on other security professionals to obtain sufficient information about the scope of a security incident and remediate the security incident. Additionally, because different security incident analysis systems may not communicate with each other, use of a single security incident analysis system to obtain information about a security incident may not provide sufficient information to remediate a security incident. Still further, because these systems may be isolated from each other, the actions performed by a computer security professional to address a security incident, and the order in which those actions were performed, may not be recorded for use by other computer security professionals to learn how a security professional addressed a security incident.

SUMMARY

One embodiment of the present disclosure includes a computer-implemented method for processing security event queries across a plurality of security incident analysis systems through a unified conversational agent executing on one or more computing devices having one or more processors. The method generally includes receiving, by the unified conversational agent from a client device, a natural language command requesting information about a security incident from a first incident analysis system; extracting, by the unified conversational agent, one or more keywords related to the security incident from the natural language command; executing, by the unified conversational agent, a search against the first incident analysis system to obtain first information about the security incident based on the extracted one or more keywords; executing, by the unified conversational agent, a search against one or more second incident analysis systems to obtain second information about the security incident based on the extracted one or more keywords; and transmitting, to the client device, an indication of the information about the security incident aggregated from the first information obtained from the executed search against the first incident analysis system and the second information obtained from the executed search against the one or more second incident analysis systems.

In some embodiments, executing the search against the first incident analysis system comprises invoking one or more application programming interface (API) calls specific to the first incident analysis system. Executing the search against the one or more second incident analysis systems may include invoking one or more API calls specific to each of the one or more second incident analysis systems distinct from the API calls specific to the first incident analysis system.

In some embodiments, the method further includes transmitting, to the client device, a message for the client device to display a prompt for the natural language command in a user interface of the client device.

In some embodiments, the natural language command is received from a user interface of the client device as an audio file. In this case, extracting the one or more keywords related to the security incident may include converting the received audio file to a textual string, tokenizing the textual string into an array of n-grams, and identifying the one or more keywords related to the security incident by comparing each n-gram in the array of n-grams to a corpus of known security incident entities.

In some embodiments, the information about the security incident aggregated from the first incident analysis system and the one or more second incident analysis systems includes one or more executable files for remediating the security incident. In this case, the method may further involve receiving, from the client device, information identifying an endpoint system on which to execute the one or more executable files. The one or more executable files may be transmitted to the identified endpoint system.

In some embodiments, the natural language command is received through a conversational interface associated with the first incident analysis system. Executing the search against the one or more second incident analysis systems may include forwarding the natural language command to conversational interfaces associated with the one or more second incident analysis systems.

In some embodiments, the information about the security incident aggregated from the first incident analysis system and the one or more second incident analysis systems includes information identifying previously investigated security incidents of the first incident analysis system and the one or more second incident analysis systems having one or more matching keywords.

Another embodiment of the present disclosure is a system that generally includes a processor and a memory having instruction stored thereon which, when executed by the processor, perform operations for processing security event queries across a plurality of security incident analysis systems through a unified conversational agent. The operations generally include receiving, by the unified conversational agent from a client device, a natural language command requesting information about a security incident from a first incident analysis system in the plurality of security incident analysis systems; extracting, by the unified conversational agent, one or more keywords related to the security incident from the natural language command; executing, by the unified conversational agent, a search against the first incident analysis system in the plurality of security incident analysis systems to obtain first information about the security incident based on the extracted one or more keywords; executing, by the unified conversational agent, a search against one or more second incident analysis systems in the plurality of security incident analysis systems to obtain second information about the security incident based on the extracted one or more keywords; and transmitting, to the client device, an indication of the information about the security incident, aggregated from the first information obtained from the executed search against the first incident analysis system and the second information obtained from the executed search against the one or more second incident analysis systems.

Another embodiment of the present disclosure includes a system. The system generally includes a plurality of incident analysis systems and a unified conversational agent communicatively coupled to the plurality of incident analysis systems. The unified conversational agent is generally configured to receive, from a client device, a natural language command requesting information about a security incident from a first incident analysis system; extract one or more keywords related to the security incident from the natural language command; execute a search against the first incident analysis system of the plurality of security incident analysis systems to obtain first information about the security incident based on the extracted one or more keywords; execute a search against one or more second incident analysis systems of the plurality of security incident analysis systems to obtain second information about the security incident based on the extracted one or more keywords; and transmit, to the client device, an indication of the information about the security incident aggregated from the first information obtained from the executed search against the first incident analysis system and the second information obtained from the executed search against the one or more second incident analysis systems of the plurality of security incident analysis systems.

Another embodiment provides a non-transitory computer-readable medium having instructions, which, when executed on a processor, perform operations for processing security event queries across a plurality of security incident analysis systems through a unified conversational agent. The operations generally include receiving, by the unified conversational agent from a client device, a natural language command requesting information about a security incident from a first incident analysis system; extracting, by the unified conversational agent, one or more keywords related to the security incident from the natural language command; executing, by the unified conversational agent, a search against the first incident analysis system to obtain first information about the security incident based on the extracted one or more keywords; executing, by the unified conversational agent, a search against one or more second incident analysis systems to obtain second information about the security incident based on the extracted one or more keywords; and transmitting, to the client device, an indication of the information about the security incident aggregated from the first information obtained from the executed search against the first incident analysis system and the second information obtained from the executed search against the one or more second incident analysis systems.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Computer security incident analysis systems generally expose interfaces that allow users, such as security professionals or information technology staff, to provide information about security incidents identified on one or more computer systems and obtain information for remediating these security incidents. As computer security incidents have become more complex and more distributed, multiple incident analysis systems may be used to track different aspects of a security incident. For example, a security incident may be initiated through multiple vectors (e.g., through one or more files including malicious components downloaded from a website, an attachment in a malicious e-mail, etc.) and cause one or more malicious actions to be performed (e.g., exfiltration of sensitive data to a network destination outside of an internal network, accessing a botnet command-and-control server to launch malicious attacks on other systems, etc.). To obtain information about the security incident, a security professional may need to search across multiple incident analysis systems—for example, search a first incident analysis system to discover the origin(s) of the security incident, search a second incident analysis system to obtain information about network traffic generated by the files causing the security incident, and so on. However, because these systems may be isolated from each other, a security professional may want to understand the specific languages or syntax used to generate a valid query against each of the security incident analysis systems.

Conversational user interfaces, such as chatbots or voice processing systems, allow users to interact with a computer system using natural language input. For example, a chatbot allows a user to interact with a computer system by sending a textual message to the chatbot, which the chatbot processes to generate the requested output (or, if the chatbot is unable to process the textual message, a notification that that the chatbot could not process the message and suggested queries generated from the received textual message). Voice processing systems generally convert an audio recording of a user command to a textual string for processing. These conversational user interfaces provide an abstraction of the data processing systems from which the conversational user interfaces obtain the requested information so that a user need not understand a domain-specific language or other specialized syntax in order to obtain a result from a specific data processing system. For example, chatbots generally extract a human intent from a received natural language input and convert the extracted human intent to a machine intent to execute a command against one or more computer systems.

Embodiments of the present disclosure describe techniques for processing queries for information about computer security incidents from a plurality of computer security incident analysis systems using a unified conversational interface system. As discussed in further detail herein, the unified conversational interface system receives natural language commands that request information about a security incident from one or more of a plurality of security incident analysis systems, each of which may expose a unique application programming interface (API) or conversational syntax for executing queries against an incident analysis system. Generally, the unified conversational interface system extracts human intents, transforms the human intents into machine intents (e.g., actions to be performed against an incident analysis system), and provides a cross-platform communication channel that allows for these intents to be recorded and mined for reusable information to aid in the resolution of security incidents. The unified conversation interface system may extract information identifying an entity of interest, such as information identifying the target of a security incident, information identifying a source of a security incident, and so on, from the received natural language commands and may generate one or more queries to search for information about the entity of interest across the plurality of security incident analysis systems. By exposing a conversational interface that serves as an abstraction layer for a plurality of security incident systems, the unified conversational interface system allows a user to search for information about a computer security incident without needing to know and use specific application programming interface (API) commands or a specific conversational syntax to obtain information about the security incident. Further, by exposing a conversational interface for searching across a plurality of computer security incident analysis systems and maintaining a history of user search queries across the plurality of computer security incident analysis systems, the unified conversational interface system may allow a user to obtain information about a security incident from multiple security incident analysis systems, as well as about related security incidents from these systems.

Embodiments of the present disclosure may be executed in a cloud computing environment in which the unified conversational interface system and the one or more security incident analysis systems are deployed on remote computer resources over a network. The unified conversational interface system and the one or more security incident analysis systems may be deployed, for example, in containerized workloads or virtual machines executing on compute resources shared by a plurality of services and may be migrated between different sets of compute resources (e.g., different physical servers or server farms) on an as-needed basis.

Figure 1:
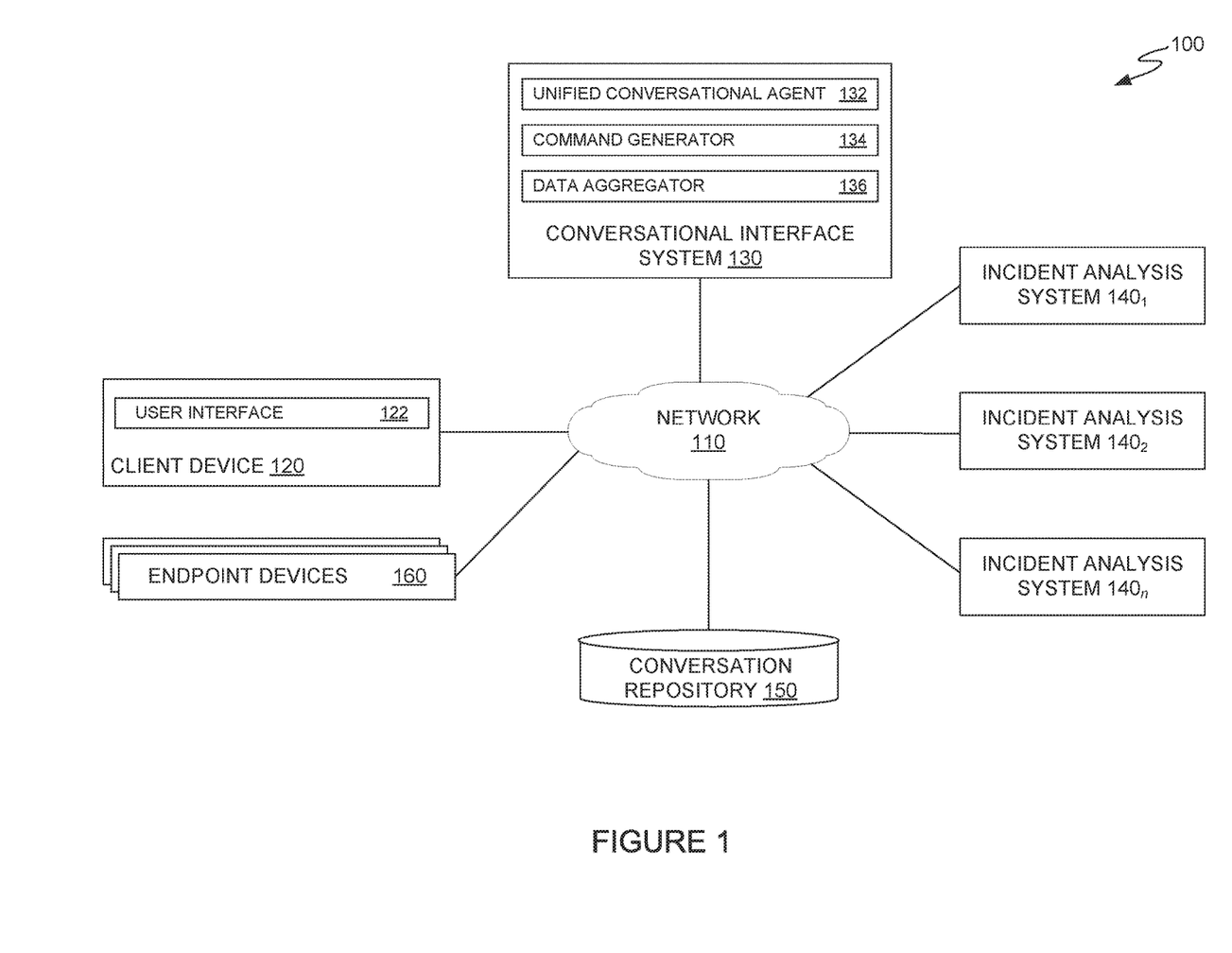
FIG. 1 illustrates an example networked computing environment with incident analysis systems, according to one embodiment.

FIG. 1 illustrates an example networked system in which a conversational interface system facilitates searches for information about a computer security incident from a plurality of incident analysis systems, according to an embodiment. As illustrated, networked system 100 includes a client device 120, a conversational interface system 130, a plurality of incident analysis systems $140_1$, $140_2$, . . . , $140_n$ (collectively referred to as "incident analysis systems 140"), a conversation repository 150, and one or more endpoint systems 160, connected via network 110. Network 110 may be a local network (e.g., a local area network (LAN) or a wireless local area network (WLAN)) or a remote network (e.g., a network in which at least some of client device 120, conversational interface system 140, incident analysis systems 140, conversation repository 150, and the one or more endpoint systems 160 are connected via the Internet).

As illustrated, client device 120 executes one or more programs that display or otherwise expose a user interface 122 for interacting with the one or more incident analysis systems 140 through conversational interface system 130. Client device 120 may be a desktop computer, a laptop, a mobile (handheld) computer, a terminal, or other computing devices connected to network 110 through which a user can provide input and receive output in audio and/or visual form. User interface 122 may include, for example, a speech-to-text system that allows a user to provide a query as a spoken command, a text messaging system (e.g., short messaging service (SMS) or chat interfaces) that allows a user to provide a query as a typed message, or other natural language input systems that allow a user to provide a query in a natural language format (e.g., in a format that is not specific to a particular incident analysis system 140). In some embodiments, user interface 122 may allow a user to include one or more files with a natural language command. These files may include, for example, screenshots illustrating activity of interest (e.g., task lists showing abnormally high processor utilization or network traffic generated by a process), files to be analyzed for malware, and so on.

Client device 120 transmits the natural language command received through user interface 122 and, if included, any files attached to the natural language command to conversational interface system 130 for processing. In response, conversational interface system 130 processes the received natural language command against an incident analysis system 140 identified in the natural language command and, if applicable, one or more other incident analysis systems 140, aggregates the results, and transmits the aggregated results to client device 120 for display via user interface 122. In some embodiments, as discussed in further detail herein, user interface 122 may additionally be configured to receive notifications (e.g., asynchronous notifications) from conversational interface system 130 about one or more security incidents that a user may have previously analyzed through conversational interface system 130. For example, if a first user has previously searched for information about a security incident related to entity "A," (e.g., a targeted system, a source of an attack, a network destination detected in generated traffic, and so on) and a second user initiates a search for information about the security incident related to entity "A" on the same incident analysis system 140 or in different incident analysis systems including entity "A" in a conversational model, conversational interface system 130 may transmit a notification for display on user interface 122 of the client device 120 used by the first user. The notification may, for example, identify the second user and the security incident related to entity "A" so that the first and second users can communicate (e.g., via a chat interface provided by conversational interface system 130, e-mail, and/or the like) and exchange information about the security incident.

Conversational interface system 130 generally facilitates executing queries across a plurality of incident analysis systems 140. As discussed above, the conversational user interface serves as an abstraction between a user of client device 120 and the one or more incident analysis systems 140 so that a user of client device 120 can execute queries against the one or more incident analysis systems 140 through conversational interface system 130 without the use of specific application programming interface (API) function calls or syntax specific to a particular incident analysis system 140. As illustrated in FIG. 1, conversational interface system 130 includes a unified conversational agent 132, command generator 134, and data aggregator 136.

Unified conversational agent 132 may be trained with a plurality of conversational models tailored for each of the plurality of incident analysis systems 140 to parse natural language commands received from the client device 120. The conversational models may include natural language understanding (NLU) modules, dialogue, and natural language generation modules specific to each incident analysis system 140. By including conversational models tailored for each of the plurality of incident analysis systems 140, unified conversational agent 132 can extract information from a received natural language command targeting a specific incident analysis system, generate the appropriate commands to retrieve information from the targeted incident analysis system, and generate dialog to be presented to the user on a user interface 122 of the client device 120 as if the user were interacting with a conversational agent of the targeted incident analysis system.

Generally, unified conversational agent 132 receives a natural language command and parses the natural language command to identify one or more entities of interest in the natural language command. The natural language command may be received from a client device 120 directly or through a conversational interface exposed by one or more of the incident analysis systems 140. In some embodiments, the unified conversational agent 132 can parse the natural language command according to a conversational model associated with a specified incident analysis system in the received natural language command. As discussed herein, the one or more entities of interest may include information identifying a target of a security incident (e.g., the systems affected by an external attack, such as a denial of service attack), the source of a security incident (e.g., the system(s) from which a malicious file originated or was received), network destinations accessed by executable code associated with a security incident, and so on.

To identify the one or more entities of interest in the natural language command, unified conversational agent 132 can decompose the received natural language command into one or more arrays of n-grams. For example, unified conversational agent 132 can decompose the received natural language command into an array of individual words (e.g., n-grams of length 1) and one or more arrays of n-grams of increasing length (e.g., an array of 2-grams, an array of 3-grams, and so on). For each n-gram in the generated arrays, unified conversational agent 132 can compare the n-gram to a dictionary of words or use named entity recognition models to identify n-grams that relate to a security incident. In some embodiments, unified conversational agent 132 can additionally compare the n-grams in each of the generated arrays to identify entities of interest corresponding to network addresses, e-mail addresses, or other information that conforms to a particular format. The regular expressions may, for example, specify that an n-gram corresponding to a network address conforms to a known format (e.g., an Internet Protocol (IP) address having a length of 32 bits in four octets (i.e., an IPv4 address) or a length of 128 bits in eight sixteen-bit groups (i.e., an IPv6 address)), a web domain conforms to the format of "*.[top level domain]," an e-mail address conforms to the format of "*@[domain].[top level domain]," and so on. These n-grams may include, for example, information identifying a specific system experiencing a security incident (e.g., the name of a specific application or service), information identifying a network destination that is either the source of a security incident or a network destination accessed by malware (e.g., an IP address, a domain name, an e-mail address, etc.), or other keywords or phrases that identify an entity of interest in a received natural language command.

To identify which incident analysis system(s) 140 to query, in addition to the incident analysis system identified in the received natural language command, unified conversational agent 132 searches the conversational models associated with the targeted incident analysis system 140 and the one or more other incident analysis systems for the entities of interest extracted from the received natural language command. The identified incident analysis systems to query generally include incident analysis systems associated with conversational models with dictionaries or other corpuses of known security incident entities including the identified entities of interest. By searching conversational models associated with the targeted incident analysis system 140 and the one or more other incident analysis systems, as well as a conversation history of other users, as discussed in further detail below, unified conversational agent 132 can generate a playbook of actions and searches to address and resolve a particular security incident that other users can re-use. Further, by searching conversational models and a conversation history of other users, unified conversational agent 132 can provide a personalized conversational experience to security professionals analyzing a security incident.

In some embodiments, unified conversational agent 132 can search, or mine, conversation repository 150 to determine whether to trigger the generation of notification(s)—to one or more other users of the unified conversational agent 132 and/or of one or more incident analysis systems 140—that a current user is searching for information that the other users have previously searched for. The one or more incident analysis systems 140 may include incident analysis systems associated with conversational models with dictionaries or entity definitions including the extracted entity of interest. In some embodiments, the notification may include information identifying the current user, such as the current user's contact information, so that the other users can contact the current user with information about the security incident. In some embodiments, unified conversational agent 132 may transmit information identifying the one or more other users that have previously handled security incidents related to the entity of interest to client device 120 for display on user interface 122 to allow a user to contact the one or more other users. In some embodiments, search results associated with the previous queries for an entity of interest may be cached at conversation repository 150 to accelerate the delivery of search results to a user. The cached search results may be associated with an expiry timestamp. In this case, if the time at which unified conversational agent 132 searches conversation repository 150 for the cached search results is before the expiry timestamp, unified conversational agent 132 can retrieve the cached search results from conversation repository 150 and provide the cached search results to data aggregator 136 for presentation to a user of client device 120. Otherwise, unified conversational agent 132 includes the entity of interest and identified incident analysis system 140 in one or more commands instructing command generator 134 to execute an updated query for information from the identified incident analysis system 140.

Based on the extracted entities of interest, the identified incident analysis system, and one or more other incident analysis systems with conversational models including the extracted entities of interest, command generator 134 may generate one or more search queries to search for information from the plurality of incident analysis systems 140 about a security incident arising from or related to the extracted entities of interest. Command generator 134 generally uses API function definitions or incident analysis system-specific conversational syntax to generate the search queries against the identified incident analysis system and the one or more other incident analysis systems. In some embodiments, where the natural language command is received through a conversational interface exposed by the identified incident analysis system 140, command generator 134 need not generate a search query against the identified incident analysis system 140 from which the natural language command was received. In some embodiments, command generator 134 may forward a received natural language command to conversational interfaces associated with one or more other incident analysis systems, as conversational interface system 130 may be configured to subscribe to repositories of entities of interest associated with other conversational interfaces or agents.

Data aggregator 136 may receive search results resulting from executing the generated queries against the identified incident analysis system and the one or more other incident analysis systems to generate the search results responsive to the received natural language command. In some embodiments, data aggregator 136 can use a natural language generator (not shown) associated with the identified incident analysis system and each of the one or more other incident analysis systems to generate a natural language answer responsive to the received natural language command. In some embodiments, the generated search results may include or lead to one or more additional prompts for requesting additional information from a user. For example, the one or more additional prompts may indicate that an incident analysis system 140 has one or more executable files that can be executed to remedy the security incident that is the subject of the received natural language command. The additional prompts may allow a user to download the one or more executable files onto client device 120 or removable storage attached to client device 120 so a user of client device 120 can manually instruct execution of the one or more executable files. In some embodiments, the additional prompts may allow a user to specify information identifying one or more endpoint systems 160 on which the one or more executable files can be executed. In response, conversational interface system 130 may transmit the one or more executable files and instructions to run the one or more executable files on the identified endpoint systems.

Incident analysis systems 140 generally represent different computer security incident analysis systems that can provide information about a security incident to a user of client device 120. Each incident analysis system 140 may expose a unique application programming interface (API) or natural language syntax for executing queries against the incident analysis system 140. In some embodiments, incident analysis system 140 may regularly provide updates to conversational interface system 130 indicating changes to the API or natural language syntax for executing queries against the incident analysis system, and conversational interface system 130 can use the updated API and/or natural language syntax to generate subsequent search queries to be executed against a particular incident analysis system 140.

Conversation repository 150 generally maintains a history of search queries received from various users to allow conversational interface system 130 to identify users who have searched for information about a particular security incident. Conversation repository 150 may be structured, for example, as a relational database storing a plurality of 3-tuples of {user, incident analysis system, entity of interest}, 4-tuples of {user, incident analysis system, entity of interest, security incident}, or other n-tuples of information including at least information about the user, the incident analysis system, and the entity of interest. In some embodiments, conversation repository 150 may maintain the history of search queries in a plurality of files or tables associated with each incident analysis system and entity of interest. As discussed above, when conversational interface system 130 receives a natural language command from a client device 120, conversational interface system 130 can search conversation repository 150 for information identifying other users who have searched for information about security incidents related to an extracted entity of interest.

Endpoint systems 160 generally include one or more computer systems that may be subject to a security incident being analyzed by a user of client device 120. These computer systems may include, for example, end-user devices (e.g., desktop computers, laptop computers, tablet computers, mobile phones, etc.), infrastructure components (e.g., firewalls, routers, switches, hypervisor systems, etc.), servers (e.g., mail servers, web servers, database servers, etc.), and the like.

Figure 2:
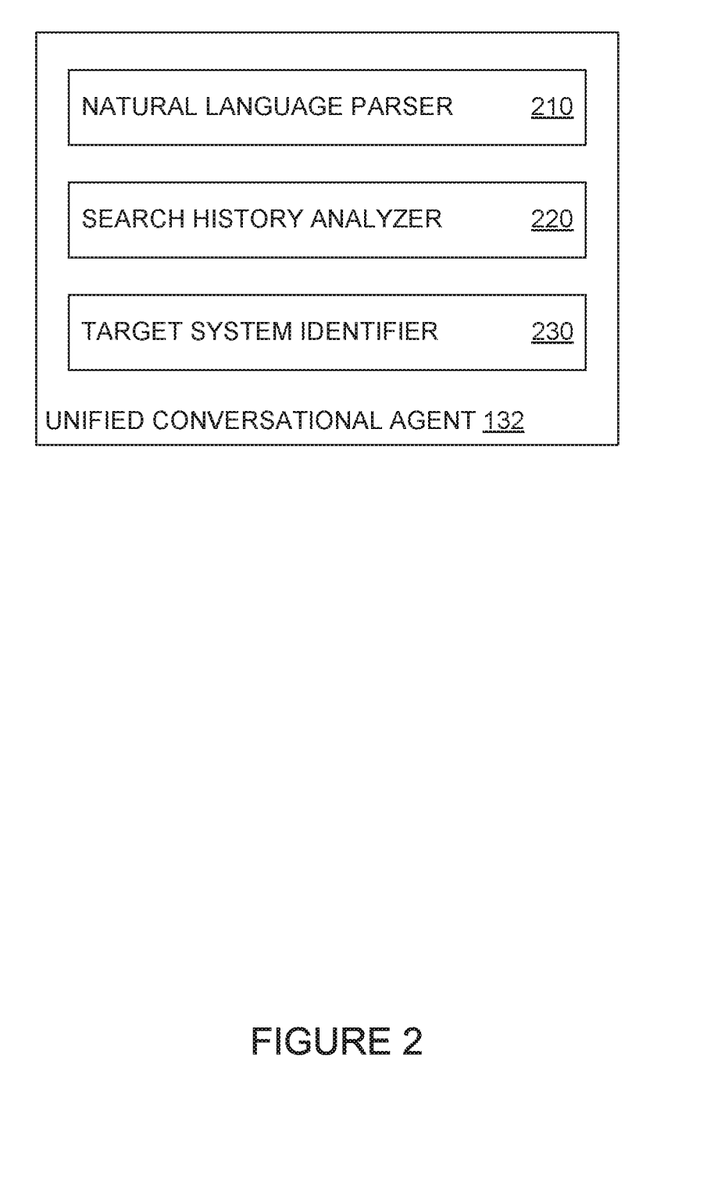
FIG. 2 illustrates an example unified conversational agent, according to one embodiment.

FIG. 2 illustrates an example unified conversational agent 132, according to an embodiment. As illustrated, unified conversational agent 132 generally includes a natural language parser 210, a search history analyzer 220, and a target system identifier 230. Conversational agent 132 may be one or more software components executing on a virtualized or non-virtualized computer system that performs actions against the plurality of incident analysis systems 140 on behalf of a user of client device 120 to facilitate searching for information about security incidents across the plurality of incident analysis systems 140.

As discussed, natural language parser 210 is generally trained with a plurality of conversational models to understand natural language commands directed to each of the plurality of incident analysis systems 140. The conversational models allow natural language parser 210 to extract entities of interest based on the identified incident analysis system in the received natural language command or the incident analysis system 140 from which unified conversational agent 132 received the natural language command. In some embodiments, where the received natural language command includes an audio file, natural language parser 210 can convert the audio file to a textual string for analysis using various speech-to-text tools. These speech-to-text tools may be trained for each user of the unified conversational agent (e.g., to account for each user's unique vocal inflection and pronunciation of specific words) or may be a standardized speech-to-text tool used to convert received speech from any user of the unified conversational agent.

To identify entities of interest in a natural language command, natural language parser 210 may generate one or more arrays of n-grams from a text representation of the received natural language command. The arrays may include, for example, an element for each word in the received natural language command, 2-grams formed from pairs of consecutive words in the natural language command, 3-grams formed from triplets of consecutive words in the natural language command, and so on. Natural language parser 210 can search the conversational model associated with the identified incident analysis system 140 and one or more other incident analysis systems 140 to identify an entity of interest in the received natural language command. In one embodiment, natural language parser 210 can search a dictionary or other entity definition repository associated with the incident analysis system 140 identified in the received natural language command to identify an entity of interest in the received natural language command.

Search history analyzer 220 generally uses the extracted entity of interest from a received natural language command to identify other users of one or more incident analysis systems who have previously executed search queries on the extracted entity of interest. Search history analyzer 220 can execute a search query against one or more tables or other data repositories in conversation repository 150 for entries including the extracted entity of interest, which, as discussed above, may include information identifying the user that executed the search for the entity of interest and the target incident analysis system of the search. Search history analyzer 220 generally receives a set of results from conversation repository 150 including records matching the entity of interest. For each record, search history analyzer 220 may extract information identifying the user that performed the search and may generate notifications to the current user interfacing with the unified conversational agent 132 through user interface 122 of client device 120 and the user(s) identified in the record to facilitate communications between the current user and the identified user(s). In some embodiments, search history analyzer 220 may additionally retrieved cached search results associated with the entity of interest from conversation repository 150 and provide the cached search results to data aggregator 136 for conversion into a conversational response to the received natural language command. As discussed, the cached search results may be associated with an expiry date, and search history analyzer 220 can initiate a new search if the expiry date of the cached search result is before the current time.

Target system identifier 230 generally uses the extracted entity of interest to identify the one or more other incident analysis systems 140 to execute searches on. To identify incident analysis systems 140 to target, target system identifier 230 generally searches the dictionaries or entity definition repositories associated with the one or more other incident analysis systems 140 to identify other incident analysis systems 140 that may have content about a security incident relating to the entity of interest. Generally, incident analysis systems associated with conversation models including the extracted entity of interest in a dictionary or entity definition repository comprise the set or incident analysis systems to target in response to the received natural language command. Incident analysis systems associated with conversation models that do not include the extracted entity of interest in a dictionary or entity definition repository need not be searched, as these incident analysis systems are likely to not contain information relevant to the received natural language command.

Figure 3:
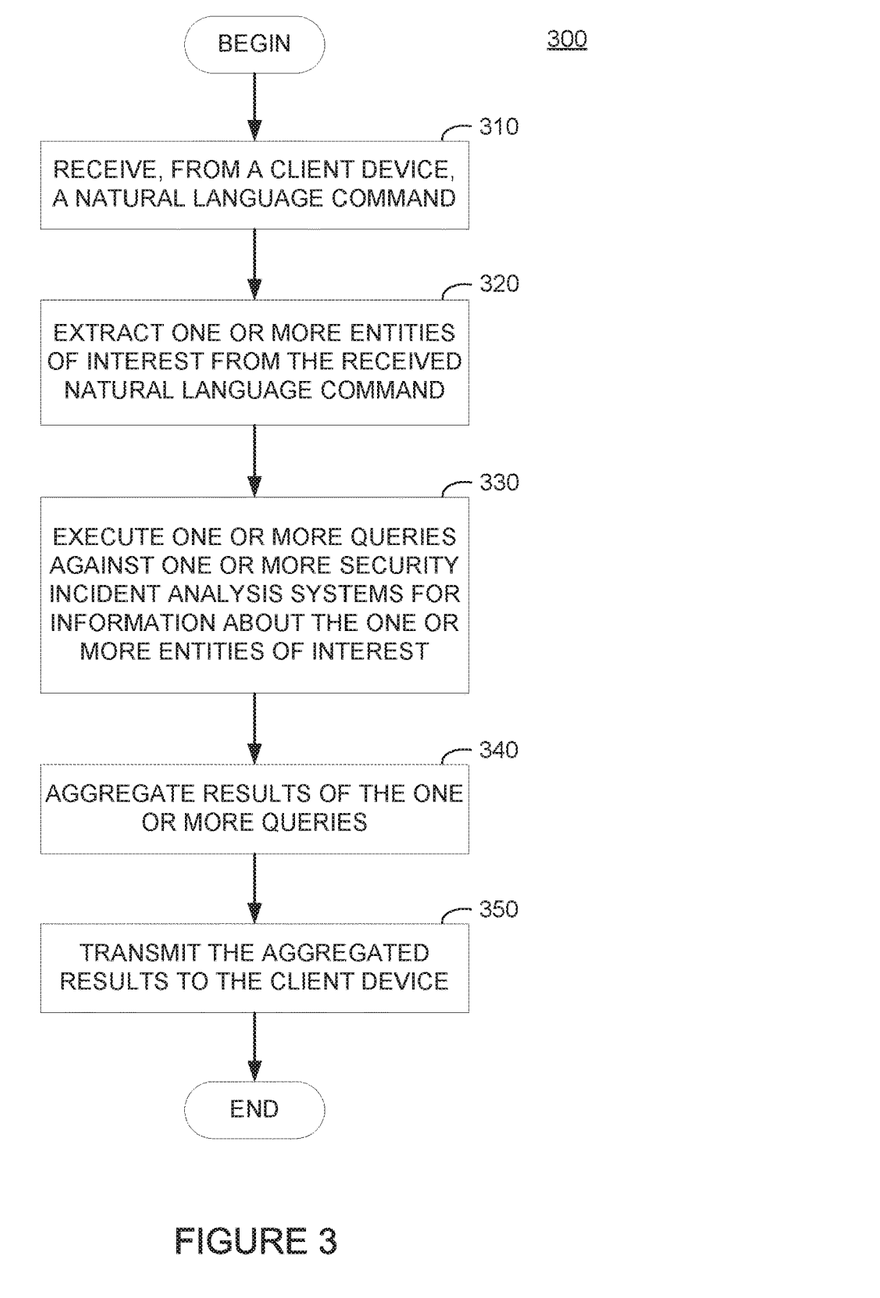
FIG. 3 illustrates example operations for processing a query for information about a computer security incident across a plurality of computer security incident analysis systems, according to one embodiment.

FIG. 3 illustrates example operations 300 for processing security event queries across a plurality of security incident analysis systems (e.g., systems 140) through a unified conversational agent (e.g., agent 132), according to an embodiment. As illustrated, operations 300 begin at block 310, where the unified conversational agent receives a natural language command from a client device (e.g., client device 120). As discussed, the natural language command may be received as a text string or an audio recording. Where the unified conversational agent receives a natural language command as an audio recording, unified conversational agent may convert the audio recording to a text string for analysis.

At block 320, the unified conversational agent extracts one or more entities of interest from the received natural language command. As discussed, the one or more entities of interest may be extracted from arrays of n-grams generated from a text string representation of the received natural language command. To extract one or more entities of interest, the unified conversational agent can search a conversational model associated with the incident analysis system identified in the natural language command or otherwise identified as a target system to find n-grams matching entries in a dictionary or entity definition repository of the identified incident analysis system.

At block 330, the unified conversational agent executes one or more queries against one or more security incident analysis systems for information about the one or more entities of interest. As discussed, the unified conversational agent can generate the queries by searching conversational models associated with the incident analysis systems other than the system identified in a received natural language command for the extracted one or more entities of interest. The one or more incident analysis systems, other than the system identified in the received natural language command, generally include systems associated with conversational models including at least one of the one or more extracted entities of interest in a dictionary or entity repository of the conversational model. The unified conversational agent may generate one or more queries against the incident analysis system identified in the received natural language command and the identified one or more other incident analysis systems according to application programming interface (API) function constructs or natural language syntaxes unique to each incident analysis system and may transmit the generated queries to the appropriate incident analysis systems for execution.

At block 340, the unified conversational agent aggregates the results of the one or more queries executed at block 330. In some embodiments, the unified conversational agent uses the natural language generators associated with each of the incident analysis systems to generate a natural language response to the received natural language command. The natural language responses associated with each of the incident analysis systems may be aggregated into an omnibus response including the results of each query and an identification of the source incident analysis system for each query result.

At block 350, the unified conversational agent transmits the aggregated results to the client device for display to a user of the client device.

Figure 4:
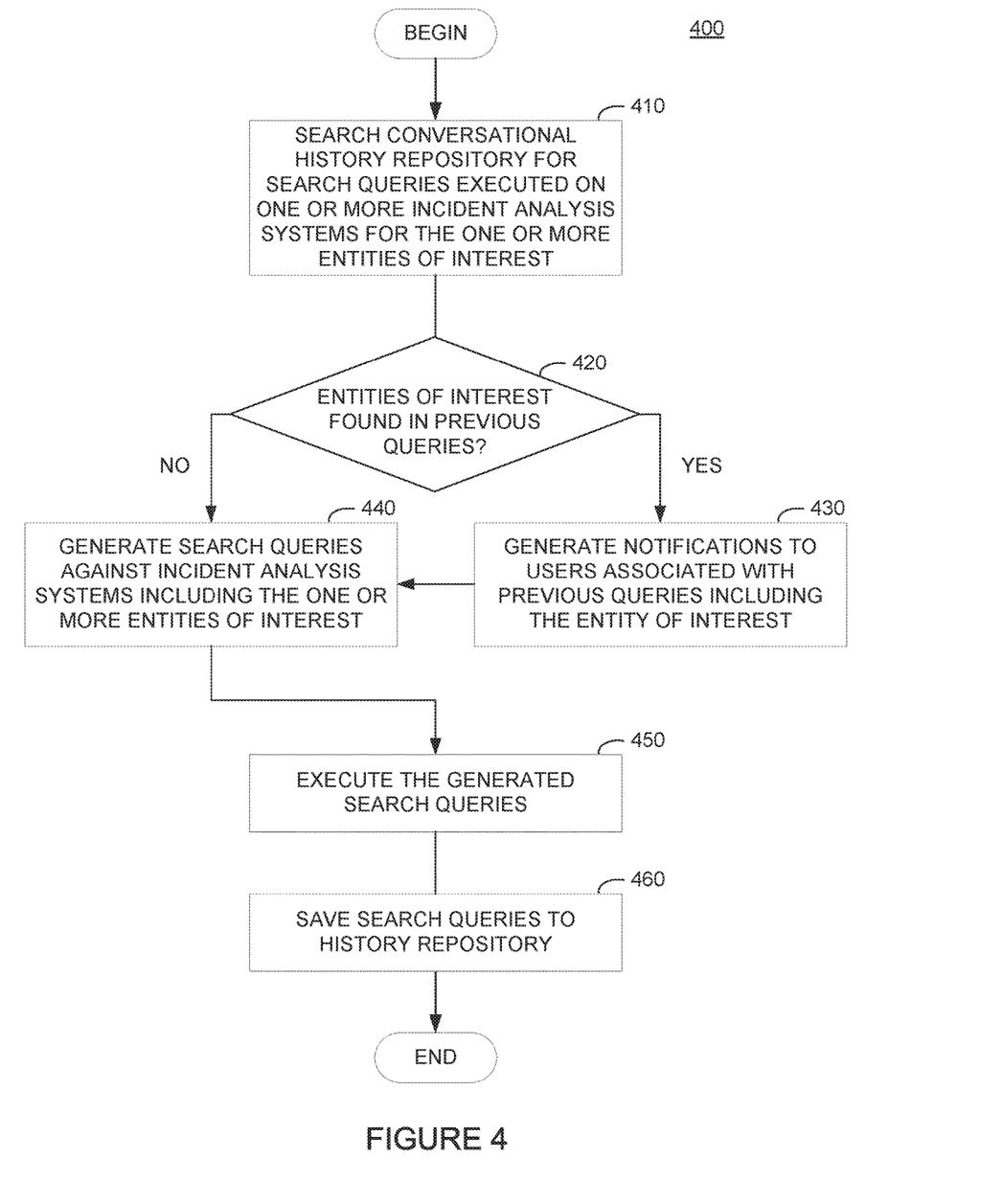
FIG. 4 illustrates example operations for generating queries against one or more computer security incident analysis systems based on prior search history, according to one embodiment.

FIG. 4 illustrates example operations 400 for generating queries and notifications to other users of a unified conversational agent (e.g., agent 132) based on an extracted entity of interest, according to an embodiment. As illustrated, operations 400 begin at block 410, where the unified conversational agent searches a conversational history repository (e.g., conversation repository 150) for search queries executed on one or more incident analysis systems (e.g., systems 140) for the one or more entities of interest.

At block 420, the unified conversational agent determines whether the one or more entities of interest were found in previous queries of a plurality of users in the conversational history repository. In some embodiments, the unified conversational agent determines whether the one or more entities of interest were found in previous queries based on the size of a result set returned from the conversational history repository. If the result set returned from the conversational history repository has a size of zero records or otherwise includes a null set, the unified conversational agent may determine that users of the unified conversational agent have not previously searched for the entities of interest, and operations 400 may proceed to block 440.

Otherwise, at block 430, the unified conversational agent generates notifications to users associated with the previous queries including the entity of interest. The notifications may be transmitted, or pushed, to the users associated with the previous queries asynchronously (i.e., without the users associated with the previous queries needing to interact with the unified conversational agent in order to receive the notification) and may include information identifying the user performing the current search for information about the entities of interest. The notifications may be transmitted, for example, as a text message to a mobile telecommunications device, an e-mail, a push notification appearing on a screen connected to or otherwise integrated into a client device, and so on. Operations 400 may then proceed to block 440.

At block 440, the unified conversational agent generates one or more search queries against the incident analysis systems including the one or more entities of interest. The one or more search queries may be executed according to an application programming interface (API) function definition or natural language syntax associated with each of the incident analysis systems, as discussed above. At block 450, the unified conversational agent executes the generated search queries.

At block 460, the unified conversational agent saves the search queries to a history repository, such as conversation repository 150. The search queries may be saved in the history repository including information about the targeted incident analysis system, the one or more entities of interest, and the user initiating the search for use in generating notifications to users who have performed similar searches, as discussed above. In some embodiments, the search results may also be saved to the history repository to accelerate retrieval of relevant information. As discussed above, the search results saved in the history repository may be associated with an expiry date, after which the search results may be presumed to be outdated such that the cached search results are provided from the history repository while the search results are considered to be relevant.

Figure 5:
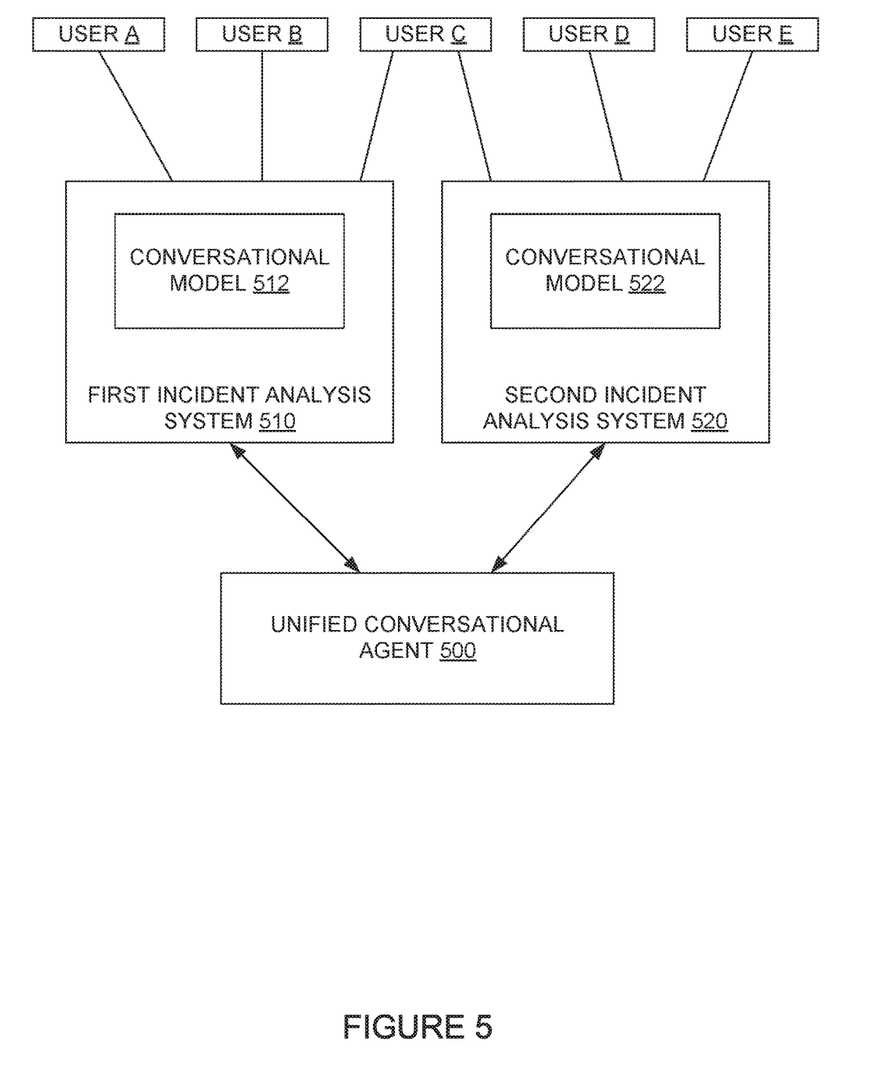
FIG. 5 illustrates an example computing environment in which multiple users interact with a plurality of computer security incident analysis systems through a unified conversational agent, according to one embodiment.

FIG. 5 illustrates an example deployment of a unified conversational agent used by multiple users of different incident analysis systems, according to an embodiment. As illustrated, unified conversational agent 500 interfaces with a first incident analysis system 510 and a second incident analysis system 520. First incident analysis system 510, as illustrated, is configured for interaction with users A, B, and C, and second incident analysis system 520 is configured for interaction with users C, D, and E.

In one example, presume that unified conversational agent 500 receives a natural language command from user A to perform an investigation of a security incident using the capabilities of first incident analysis system 510. After unified conversational agent 500 extracts one or more entities of interest from the received natural language command, unified conversational agent 500 can search a conversation history of commands issued against the first incident analysis system 510 to determine whether other users of the first incident analysis system 510 (e.g., as illustrated, users B or C) have previously searched for the same or similar entities of interest. In some embodiments, users of the first incident analysis system 510 may be notified that user A is handling a response to a security incident related to the entities of interest that those users (e.g., one or more of users B and C) have also handled previously. In some embodiments, users B and C may be notified that user A is handling a security incident that users B and C have previously handled when users B and C begin interacting with the first incident analysis system.

In another example, presume that unified conversational agent 500 receives a natural language command from user A to perform an investigation of a security incident. After unified conversational agent 500 extracts one or more entities of interest from the received natural language command (e.g., using the conversational model associated with the first incident analysis system 510), unified conversational agent 500 can determine whether the extracted entities of interest are included in conversational models associated with the second incident analysis system 520. If the extracted entities of interest are included in conversational models associated with the second incident analysis system 520, users B, C, D, and E may be notified that user A is currently handling a security incident related to or arising from the extracted entities of interest. As discussed above, the notifications may be transmitted to users who have previously handled security incidents related to the extracted entities of interest as a push (asynchronous) notification or in information accompanying the initiation of a session between any of users B, C, D, or E and unified conversational agent 500.

Figure 6:
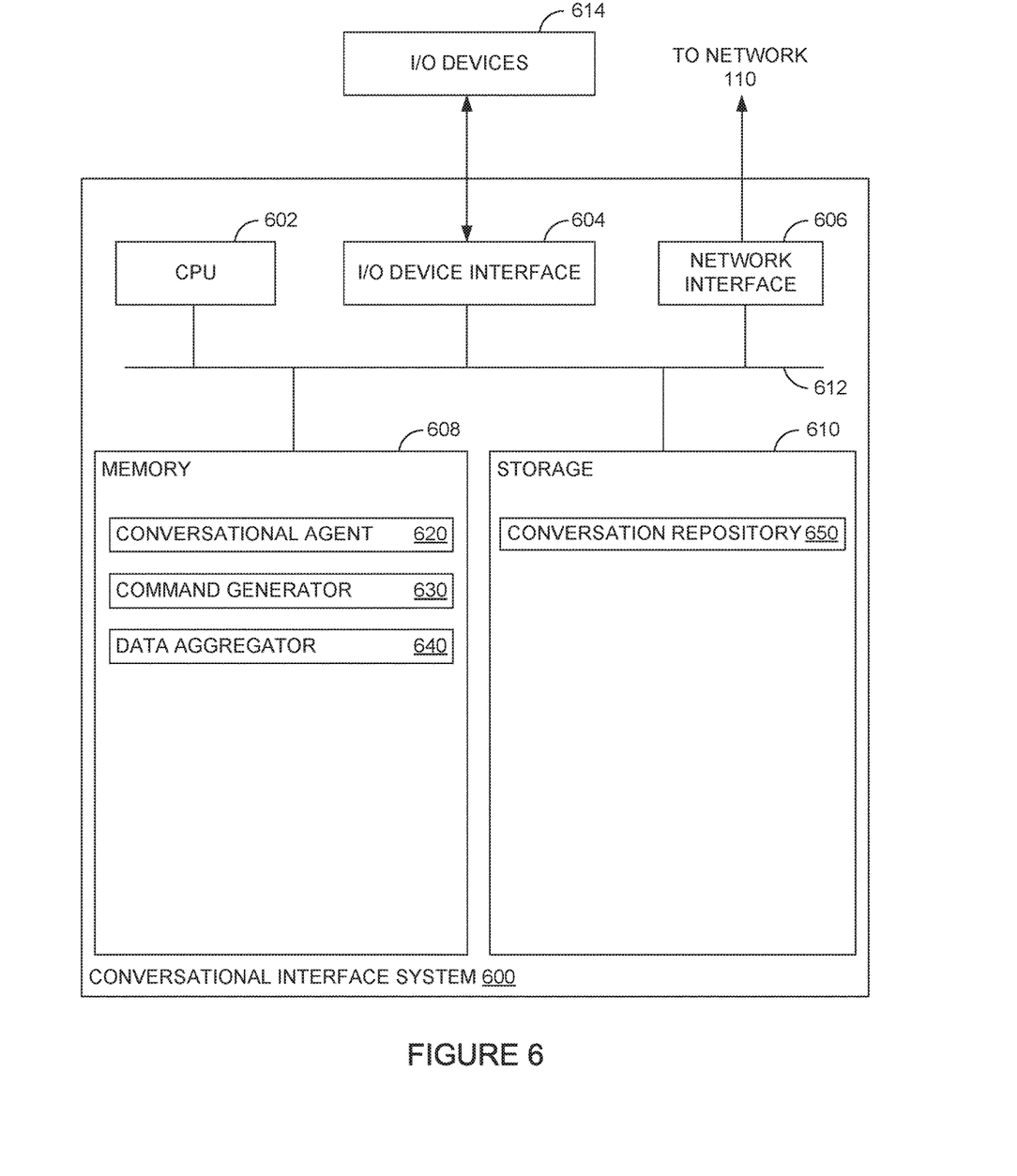
FIG. 6 illustrates an example computing system for processing queries for information about a computer security incident across a plurality of computer security incident analysis systems, according to one embodiment.

FIG. 6 illustrates an example conversational interface system 600 that exposes a conversational, or natural language, search interface for querying a plurality of security incident analysis systems, according to an embodiment. As shown, the conversational interface system 600 includes, without limitation, a central processing unit (CPU) 602, one or more I/O device interfaces 604 which may allow for the connection of various I/O devices 614 (e.g., keyboards, displays, mouse devices, pen input, etc.) to the conversational interface system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. I/O device interface 604 may provide an interface for capturing data from one or more input devices integrated into or connected to conversational interface system 600, such as keyboards, mice, touchscreens, and so on. Additionally, the memory 608 is included to be representative of a random access memory. Furthermore, the storage 610 may be a disk drive. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes a conversational agent 620, a command generator 630, and a data aggregator 640. Conversational agent 620 may be a unified conversational agent that exposes an interface for searching multiple incident analysis systems for information about a security incident using a unified conversational agent and conversational interface. Generally, conversational agent 620 provides an abstraction layer that allows users to interact with the multiple incident analysis systems without needing to know about the intricacies of specific application programming interfaces (APIs) or natural language syntaxes for each incident analysis system.

Conversational agent 620 generally includes a natural language parser, a search history analyzer, and a target system identifier. The natural language parser receives a natural language command from a client device via network interface 606, decomposes the natural language command into one or more arrays of n-tuples, and identifies one or more entities of interest to include in search queries against one or more incident analysis systems. The search history analyzer uses the identified entities of interest to search for users who have previously executed search queries for the same or similar entities of interest to generate notifications to those users of the current user searching for information relating to the identified entities of interest and to indicate to the current user the identities of users who have previously executed search queries for the same or similar entities of interest. The target system identifier generally searches conversational models associated with each of the incident analysis systems to identify incident analysis systems to execute search queries against for information relating to the identified entities of interest.

Command generator 630 uses the information about the one or more systems to execute search queries against and API or natural language syntax definitions associated with the one or more systems to generate search queries for execution. After generating the queries, command generator 630 transmits the queries to the identified incident analysis systems to execute searches on those systems for information relating to the identified entities of interest. The queries may be transmitted, for example, as an API function call including the entity of interest or a machine-generated natural language command including the entity of interest and formatted according to a natural language syntax unique to a specific incident analysis system. In response, data aggregator 640 receives the search results from the one or more incident analysis systems and generates an aggregated search result for transmission to a client device via network interface 606. The aggregated search result may include, for example, search results from each of the identified incident analysis systems converted into natural language responses by the natural language generators associated with each incident analysis system.

As shown, storage 610 includes a conversation repository 650. Conversation repository 650 generally stores a history of entities of interest for which users have executed searches through the conversational interface system 600. As discussed, the history may include information identifying the user initiating the search, the one or more entities of interest included in the search, and the incident analysis system that performed the search. This history information may be used, for example, by conversational agent 620 to connect users of the conversational interface system 600 who have previously performed the same or similar searches, to provide recently cached search results to a user to accelerate processing of natural language commands processed by the conversational interface system, and so on.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, and/or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a claim.

Aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer-readable medium(s) having computer-readable program code embodied thereon.

Any combination of one or more computer-readable media may be utilized. A computer-readable medium may be a computer-readable signal medium or a computer-readable storage medium. A computer-readable storage medium may be, for example, but not limited to, an electronic, magnetic, optical, electromagnetic, infrared (IR), or semiconductor system, apparatus, or device, or any suitable combination of the foregoing. More specific examples a computer-readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer-readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for processing security event queries across a plurality of security incident analysis systems through a unified conversational agent executing on one or more computing devices having one or more processors, the method comprising:
   receiving, by the unified conversational agent from a client device, a natural language command requesting information about a security incident from a first incident analysis system;
   extracting, by the unified conversational agent, one or more keywords related to the security incident from the natural language command;
   executing, by the unified conversational agent, a search against the first incident analysis system to obtain first information about the security incident based on the extracted one or more keywords;
   executing, by the unified conversational agent, a search against one or more second incident analysis systems to obtain second information about the security incident based on the extracted one or more keywords; and
   transmitting, by the unified conversational agent to the client device, an indication of the information about the security incident aggregated from the first information obtained from the executed search against the first incident analysis system and the second information obtained from the executed search against the one or more second incident analysis systems.

2. The computer-implemented method of claim 1, wherein executing the search against the first incident analysis system comprises invoking one or more application programming interface (API) calls specific to the first incident analysis system.

3. The computer-implemented method of claim 2, wherein executing the search against the one or more second incident analysis systems comprises invoking one or more API calls specific to each of the one or more second incident analysis systems distinct from the API calls specific to the first incident analysis system.

4. The computer-implemented method of claim 1, further comprising:
   transmitting, to the client device, a message for the client device to display a prompt for the natural language command in a user interface of the client device.

5. The computer-implemented method of claim 1, wherein the natural language command is received from a user interface of the client device as an audio file, and wherein extracting the one or more keywords related to the security incident comprises:
   converting the received audio file to a textual string,
   tokenizing the textual string into an array of n-grams, and
   identifying the one or more keywords related to the security incident by comparing each n-gram in the array of n-grams to a corpus of known security incident entities.

6. The computer-implemented method of claim 1, wherein the information about the security incident aggregated from the first incident analysis system and the one or more second incident analysis systems includes one or more executable files for remediating the security incident.

7. The computer-implemented method of claim 6, further comprising:
   receiving, from the client device, information identifying an endpoint system on which to execute the one or more executable files; and
   transmitting the one or more executable files to the identified endpoint system.

8. The computer-implemented method of claim 1, wherein the natural language command is received through a conversational interface associated with the first incident analysis system.

9. The computer-implemented method of claim 8, wherein executing the search against the one or more second incident analysis systems comprises forwarding the natural language command to conversational interfaces associated with the one or more second incident analysis systems.

10. The computer-implemented method of claim 1, wherein the information about the security incident aggregated from the first incident analysis system and the one or more second incident analysis systems comprises information identifying previously investigated security incidents of the first incident analysis system and the one or more second incident analysis systems having one or more matching keywords.

11. A system comprising:
   a processor; and
   a memory having instructions stored thereon which, when executed by the processor, perform operations for processing security event queries across a plurality of security incident analysis systems through a unified conversational agent, the operations comprising:
      receiving, by the unified conversational agent from a client device, a natural language command requesting information about a security incident from a first incident analysis system in the plurality of security incident analysis systems;
      extracting, by the unified conversational agent, one or more keywords related to the security incident from the natural language command;
      executing, by the unified conversational agent, a search against the first incident analysis system in the plurality of security incident analysis systems to obtain first information about the security incident based on the extracted one or more keywords;
      executing, by the unified conversational agent, a search against the one or more second incident analysis systems in the plurality of security incident analysis systems to obtain second information about the security incident based on the extracted one or more keywords; and
      transmitting, to the client device, an indication of the information about the security incident aggregated from the first information obtained from the executed search against the first incident analysis system and the second information obtained from the executed search against the one or more second incident analysis systems.

12. The system of claim 11, wherein executing the search against the first incident analysis system comprises invoking one or more application programming interface (API) calls specific to the first incident analysis system.

13. The system of claim 12, wherein executing the search against the one or more second incident analysis systems comprises invoking one or more API calls specific to each of the one or more second incident analysis systems distinct from the API calls specific to the first incident analysis system.

14. The system of claim 11, wherein the operations further comprise:
   transmitting, to the client device, a message for the client device to display a prompt for the natural language command in a user interface of the client device, wherein the natural language command is received from the user interface of the client device as an audio file, and wherein extracting the one or more keywords related to the security incident comprises:
   converting the received audio file to a textual string,
   tokenizing the textual string into an array of n-grams, and
   identifying the one or more keywords related to the security incident by comparing each n-gram in the array of n-grams to a corpus of known security incident entities.

15. The system of claim 11, wherein the information about the security incident aggregated from the first incident analysis system and the one or more second incident analysis systems includes one or more executable files for remediating the security incident.

16. The system of claim 15, wherein the operations further comprise:
   receiving, from the client device, information identifying an endpoint system on which to execute the one or more executable files; and
   transmitting the one or more executable files to the identified endpoint system.

17. The system of claim 11, wherein the natural language command is received through a conversational interface associated with the first incident analysis system.

18. The system of claim 17, wherein executing the search against the one or more second incident analysis systems comprises forwarding the natural language command to conversational interfaces associated with the one or more second incident analysis systems.

19. The system of claim 11, wherein the information about the security incident aggregated from the first incident analysis system and the one or more second incident analysis systems comprises information identifying previously investigated security incidents of the first incident analysis system and the one or more second incident analysis systems having one or more matching keywords.

20. A system comprising:
   a plurality of incident analysis systems; and
   a unified conversational agent communicatively coupled to the plurality of incident analysis systems and configured to:
   receive, from a client device, a natural language command requesting information about a security incident from a first incident analysis system in the plurality of incident analysis systems;
   extract, from the natural language command, one or more keywords related to the security incident;
   execute a search against the first incident analysis system in the plurality of incident analysis systems to obtain first information about the security incident based on the extracted one or more keywords;
   execute a search against the second incident analysis system in the plurality of incident analysis systems to obtain second information about the security incident based on the extracted one or more keywords; and
   transmit, to the client device, an indication of the information about the security incident aggregated from the first information obtained from the executed search against the first incident analysis system and the one or more second incident analysis systems.

\* \* \* \* \*